(12) United States Patent
Wang

(10) Patent No.: US 11,957,105 B2
(45) Date of Patent: Apr. 16, 2024

(54) REMOTE-CONTROLLED AUTOMATIC DOG-TEASING BALL

(71) Applicant: Hu Wang, Shenzhen (CN)

(72) Inventor: Hu Wang, Shenzhen (CN)

( * ) Notice: Subject to any disclaimer, the term of this patent is extended or adjusted under 35 U.S.C. 154(b) by 0 days.

(21) Appl. No.: 18/142,052

(22) Filed: May 2, 2023

(65) Prior Publication Data

US 2024/0041001 A1  Feb. 8, 2024

(51) Int. Cl.
*A01K 15/02* (2006.01)

(52) U.S. Cl.
CPC .................................. *A01K 15/025* (2013.01)

(58) Field of Classification Search
CPC .... A01K 15/025; A63H 11/02; A63H 33/005; A63H 29/22
See application file for complete search history.

(56) References Cited

U.S. PATENT DOCUMENTS

| | | | | |
|---|---|---|---|---|
| 4,726,800 A * | 2/1988 | Kobayashi | ........... | A63H 33/005 446/458 |
| 5,072,938 A * | 12/1991 | Shin | ........... | A63B 43/04 473/613 |
| 5,533,920 A * | 7/1996 | Arad | ........... | A63H 33/005 446/458 |
| 8,894,465 B2 * | 11/2014 | McClintock | ........ | A63H 33/005 446/431 |
| 2004/0162138 A1 * | 8/2004 | Hammond | ........... | A63H 13/06 463/30 |
| 2004/0219499 A1 * | 11/2004 | Cesa | ........... | A63H 11/00 434/258 |
| 2005/0005873 A1 * | 1/2005 | Gick | ........... | A01K 15/025 119/707 |
| 2015/0342145 A1 * | 12/2015 | Christianson | ........ | H04W 4/80 119/51.01 |
| 2018/0077897 A1 * | 3/2018 | Christianson | ........ | A01K 5/02 |
| 2018/0160648 A1 * | 6/2018 | Goh | ........... | A01K 15/02 |

FOREIGN PATENT DOCUMENTS

CN        107751021 A  *  3/2018

* cited by examiner

*Primary Examiner* — Trinh T Nguyen
(74) *Attorney, Agent, or Firm* — Jose Cherson Weissbrot

(57) ABSTRACT

The present invention discloses a remote-controlled automatic dog-teasing ball, which comprises an upper shell and a lower shell which are spliced into a ball shape, wherein a driving box is arranged in the upper shell and the lower shell, the upper and lower parts of the driving box are respectively provided with a protruding fixed head and a movable head, the movable head and the lower shell are assembled in linkage by splicing; a circuit component and a driving component which are electrically connected are also arranged in the driving box; the fixed head and the circuit component are electrically connected by an elastic part, and the fixed head and the upper shell are elastically abutted and linked; the driving component comprises a motor and a gear, and transmission between the motor and the movable head is achieved by the gear; the circuit component comprises a control motherboard, and at least a receiving module, a vibration switch and an LED lamp are arranged on the control motherboard.

4 Claims, 5 Drawing Sheets

REMOTE-CONTROLLED AUTOMATIC DOG-TEASING BALL

TECHNICAL FIELD

The present invention relates to a pet toy, in particular to a remote-controlled automatic dog-teasing ball.

BACKGROUND

Ball toys can easily attract the attention of cats and dogs because they can move quickly, so more and more ball toys are used as pet toys by pet owners to increase the interaction between pet owners and pets.

In order to increase the interest of pet balls, in the prior art, electronic devices are arranged inside the ball-shaped toys, so that the ball-shaped toys can move automatically. For example, U.S. Patent No. US20150245593A1 discloses an article, forming a toy for a pet or child, includes an enclosure defining a three-dimensional body having an ovoid or spherical shape, an electric motor including a motor body held in place by the enclosure and a drive shaft, and an offset mass element disposed within the enclosure and mechanically coupled with the drive shaft of the electric motor. The article further includes an angular position sensor, an accelerometer sensor, and a control system configured to vary electrical power supplied to the electric motor to drive the drive shaft based, at least in part, on the measurements of angular position of the offset mass element and the angular position of the enclosure to generate rolling motion of the enclosure relative to a surface upon which the enclosure rests.

Although the ball-shaped toy can automatically move to attract the attention of pets, it is equipped with a large number of precise detection components, including angular position sensors, accelerometers and other precise electronic components. Although the installation of these precise components can improve the operability of the ball-shaped toy, due to the nature of pets, the ball-shaped toy will be subjected to various impacts, including biting, flapping, impact, etc., which will increase the failure rate of the precise components and reduce the service life of pet toys; meanwhile, in real life, the loss rate of pet toys is always high, and the solution of the ball-shaped toys will also increase the use cost of pet owners.

Based on the above problems, it is necessary to put forward a new ball toy for pets, which does not rely on precise measuring elements such as angular position sensors or accelerometers, and at the same time, its use mode can adapt to various impacts caused by pets, which can greatly improve its service life and reduce its manufacturing and use costs.

SUMMARY

The present invention provides a remote-controlled automatic dog-teasing ball, which includes an upper shell and a lower shell which are spliced into a ball shape, wherein a driving box is arranged in the upper shell and the lower shell, the upper and lower parts of the driving box are respectively provided with a protruding fixed head and a movable head; the movable head and the lower shell are assembled in linkage by splicing; a circuit component and a driving component which are electrically connected are also arranged in the driving box; the fixed head and the circuit component are electrically connected by an elastic part, and the fixed head and the upper shell are elastically abutted and linked; the driving component comprises a motor and a gear, and transmission between the motor and the movable head is achieved by the gear; the circuit component comprises a control motherboard, and at least a receiving module, a vibration switch and an LED lamp are arranged on the control motherboard.

At the same time, the present invention provides a remote-controlled automatic dog-teasing ball, which includes an upper shell and a lower shell which are spliced into a ball shape, wherein a driving box is arranged in the upper shell and the lower shell, the upper and lower parts of the driving box are respectively provided with a protruding fixed head and a movable head; the movable head and the lower shell are assembled in linkage by splicing; a circuit component and a driving component which are electrically connected are also arranged in the driving box; the fixed head and the circuit component are electrically connected by an elastic part, and the fixed head and the upper shell are elastically abutted and linked; when the upper shell and the lower shell are screwed up, the fixed head plays a disconnecting function, and in a disconnecting state, the driving component can drive the movable head to move, and the movable head drives the lower shell to rotate; when the upper shell and the lower shell are not screwed up, the fixed head plays a conducting function, and in a conducting state, the driving component cannot drive the movable head to move, and the lower shell cannot move.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the Figures.

Figure 1:
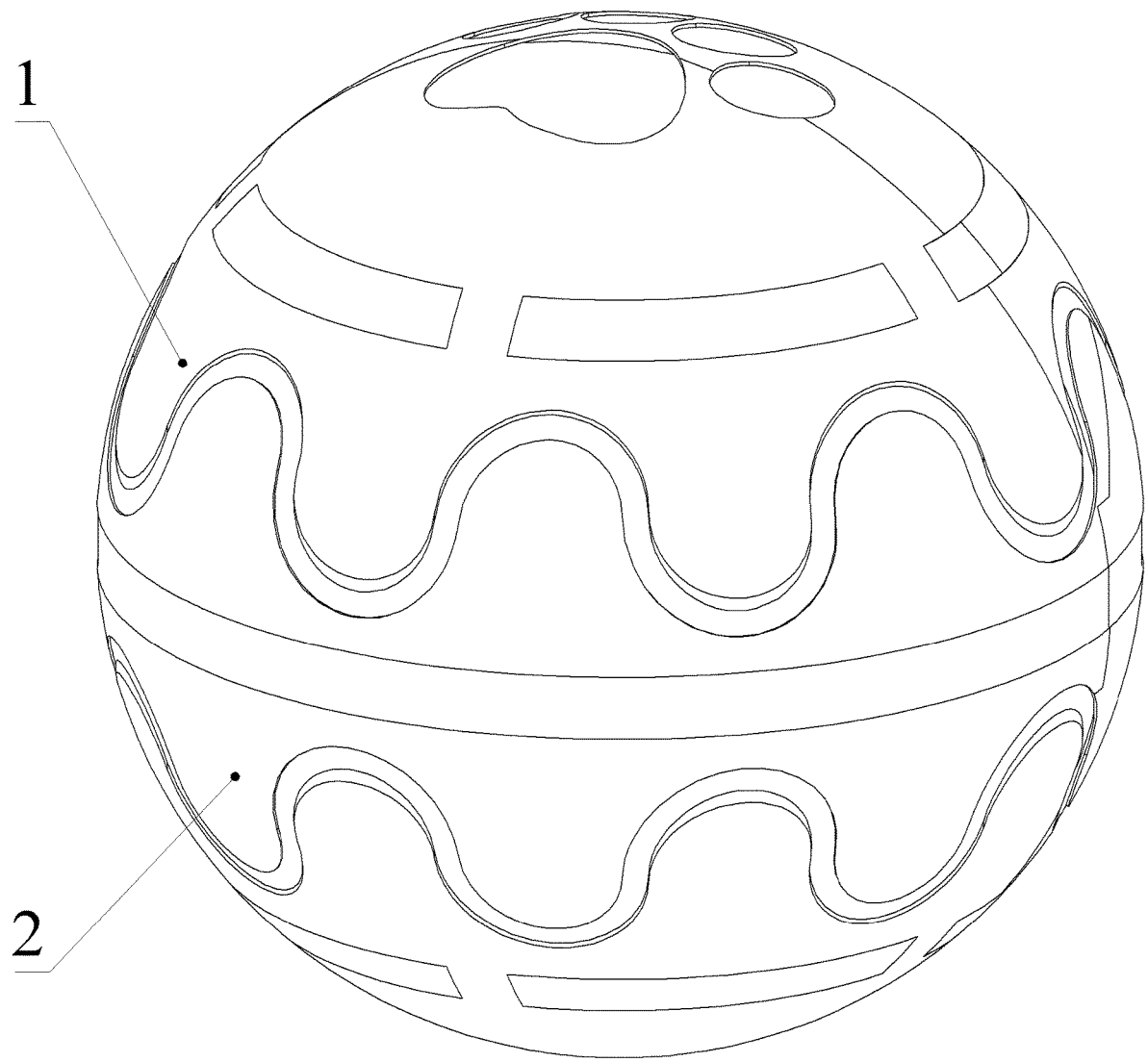
FIG. 1 is a three-dimensional schematic diagram of a remote-controlled automatic dog-teasing ball provided by the present invention.

1, Upper shell; 2, Lower shell; 3, Driving box; 6, Fixed head; 7, Movable head; 8, Motor; 9, Gear; 10, Control motherboard; 11, LED lamp; 12, On-off switch; 13, Slot; 14, Decorative ring; 15, Bent elastic steel wire; 16, Fixed steel wire; 17, Counterweight.

DESCRIPTION OF EMBODIMENTS

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

As shown in FIG. 1 to FIG. 5, a remote-controlled automatic dog-teasing ball provided by the present invention includes an upper shell 1 and a lower shell 2 which are spliced in a spherical shape, and a driving box 3 is further included in the upper shell 1 and the lower shell 2.

Different from the connection mode adopted in the prior art, the circuit component and the driving component of the present invention are arranged in the driving box 3, and the driving box 3 is added as a buffer between the circuit component and the driving component, so that the probability of damage caused by impact or clash when the circuit component and the driving component are directly and fixedly connected with the outer shell is effectively reduced, and the structural strength is greatly improved. It should be pointed out that the upper shell 1 and the lower shell 2 are decomposed in the attached drawings, and the manufacturing is actually completed by secondary injection molding in production.

Figure 2:
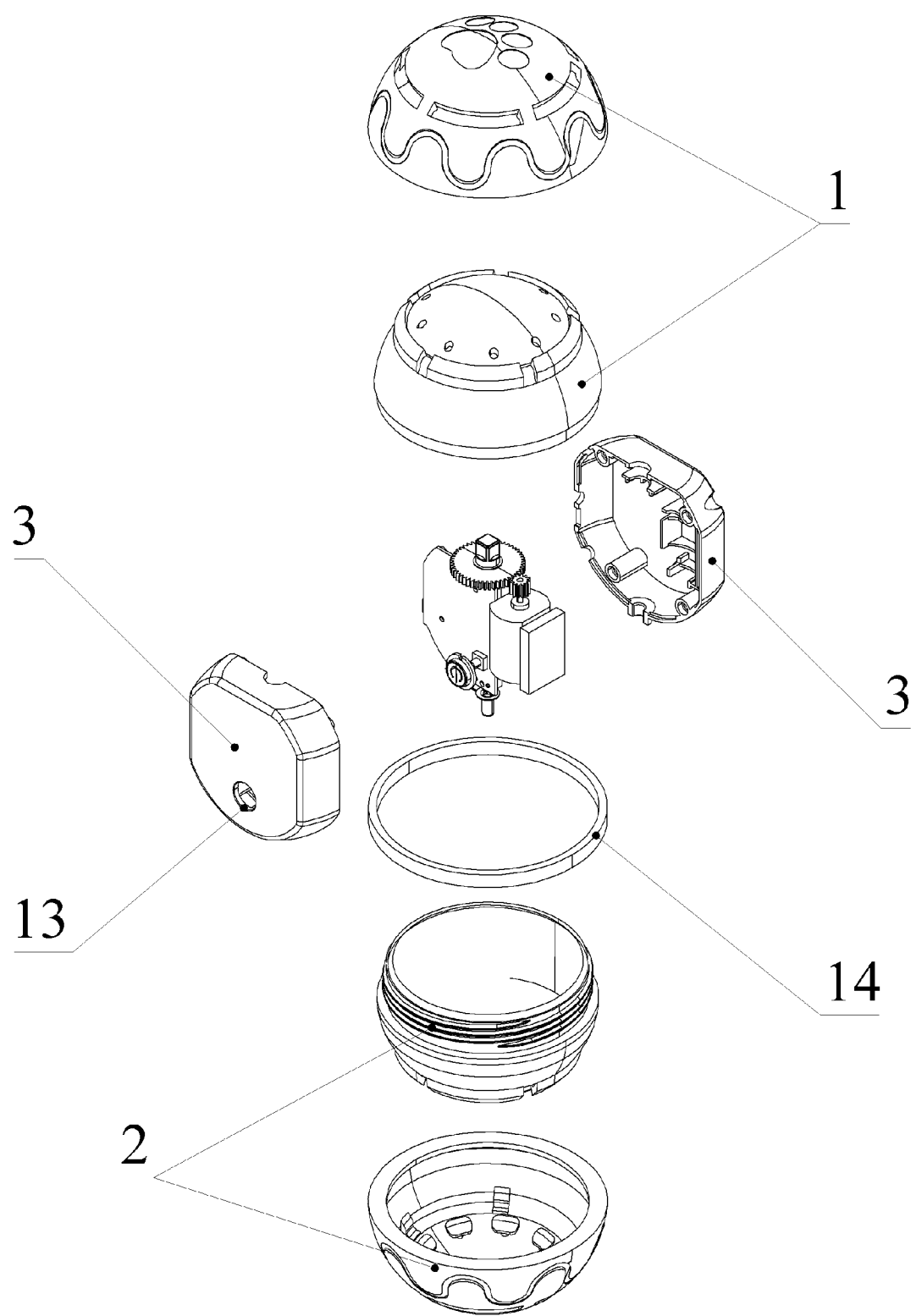
FIG. 2 is an explosion schematic diagram of a remote-controlled automatic dog-teasing ball provided by the present invention.

As shown in FIG. 2, the driving box 3 includes two outer shells. In this embodiment, the two outer shells of the driving box 3 are fastened and spliced by screws. In some embodiments, the two outer shells of the driving box 3 can be fastened and connected by buckles. In other embodiments, they can also be screwed as the splicing method of the upper shell 1 and the lower shell 2 of the present invention. In some embodiments, the outer shell of the driving box 3 has any number, and in other embodiments, the outer shell of the driving box 3 can have any desired geometry.

Figure 5:
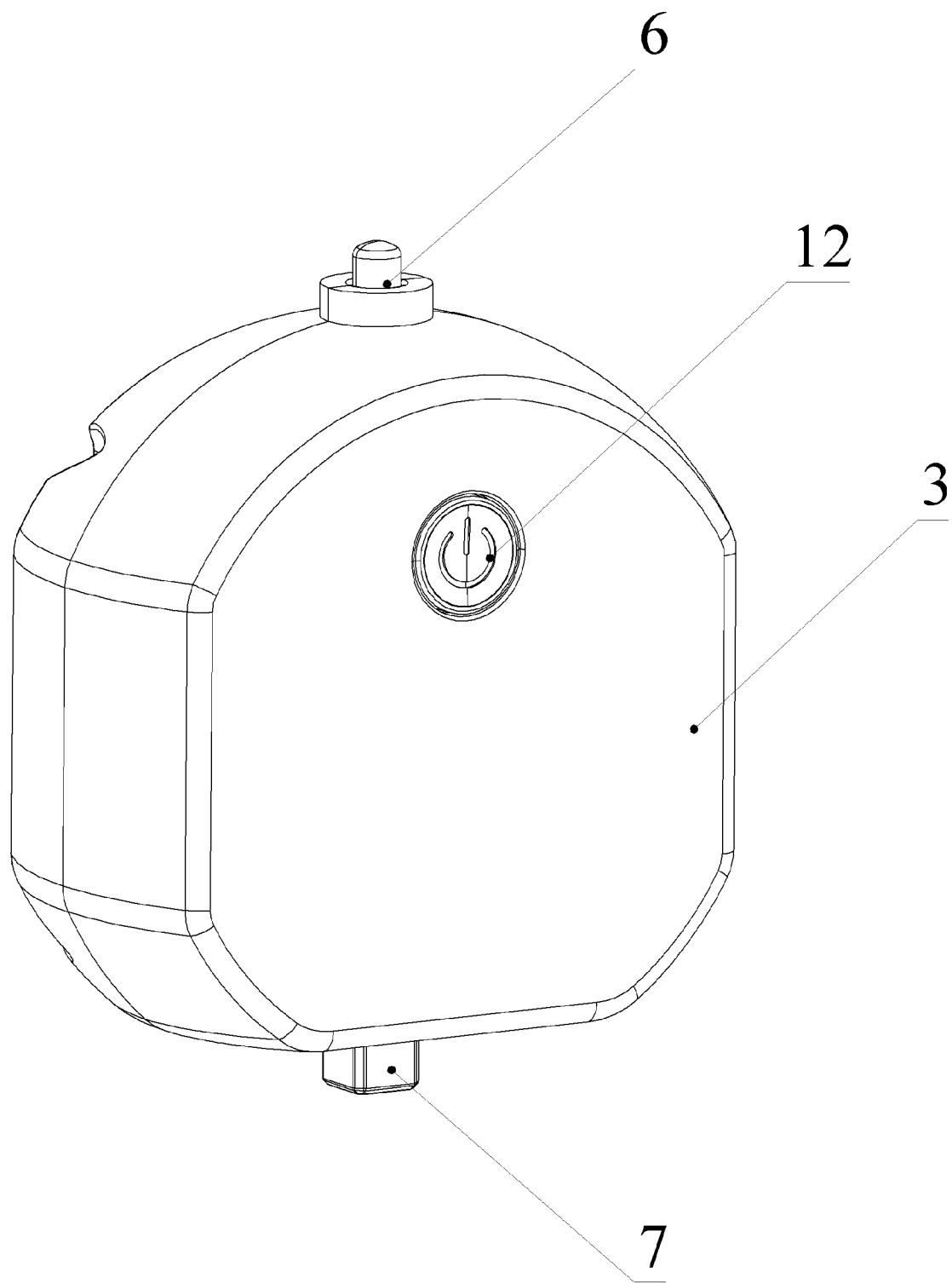
FIG. 5 is another schematic view of the driving box of the present invention.

As shown in FIG. 2, an accommodating space (not shown in the figure) is formed inside the driving box 3, which is configured to accommodate the circuit components and the driving components. As shown in FIG. 5, the upper and lower parts of the driving box 3 are respectively provided with a protruding fixed head 6 and a movable head 7, wherein the movable head 7 and the lower shell 2 are assembled in a joint linkage way, and when the driving box is triggered to rotate or drive, the lower shell 2 is driven to move through the movable head 7. In this embodiment, the fixed head 6 and the movable head 7 are relatively separated from each other, and in some embodiments, the fixed head 6 and the movable head 7 are relatively separated from each other, or they can be connected by a shaft.

Figure 3:
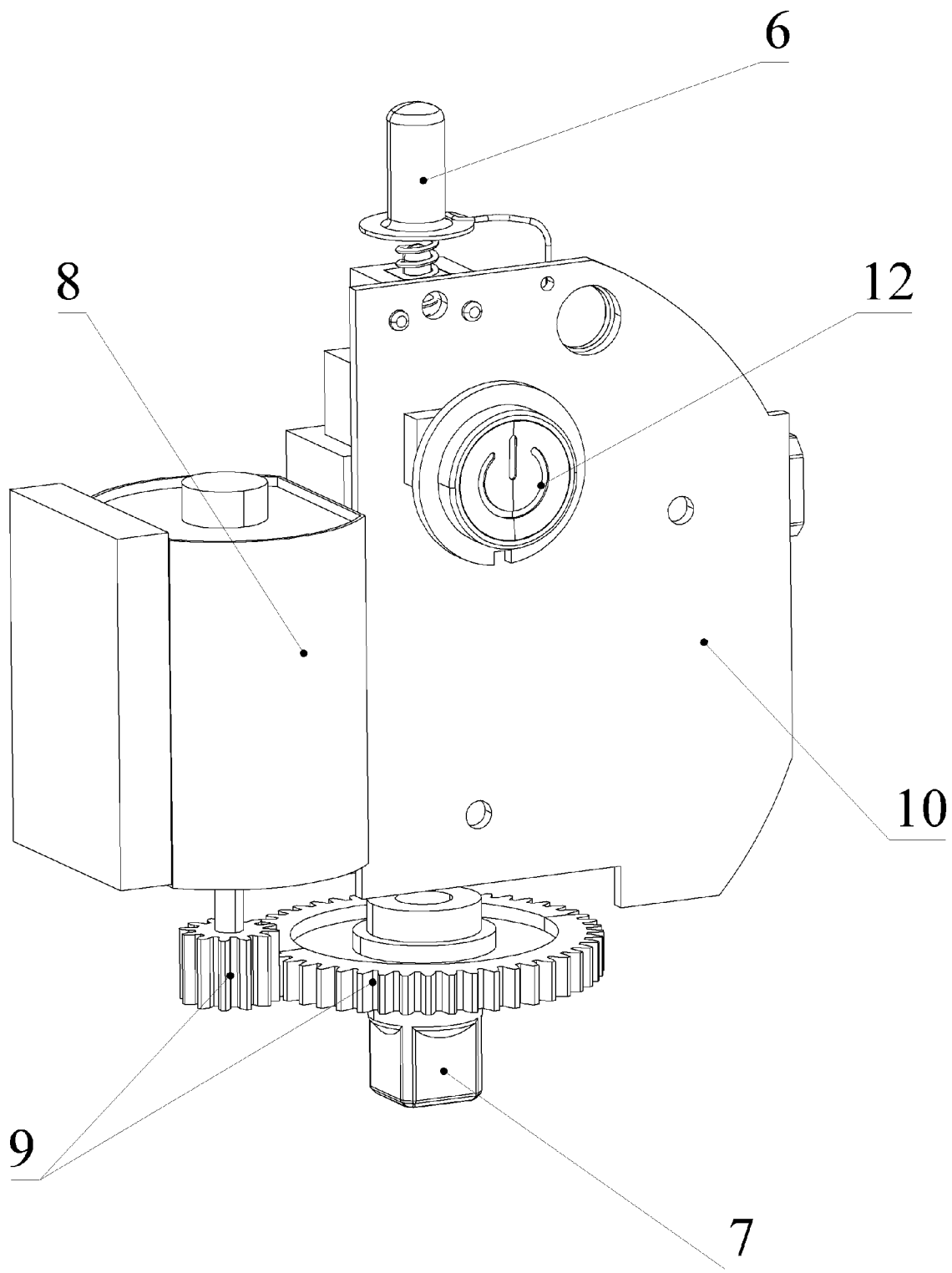
FIG. 3 is a schematic diagram of the driving box of the present invention.
Figure 4:
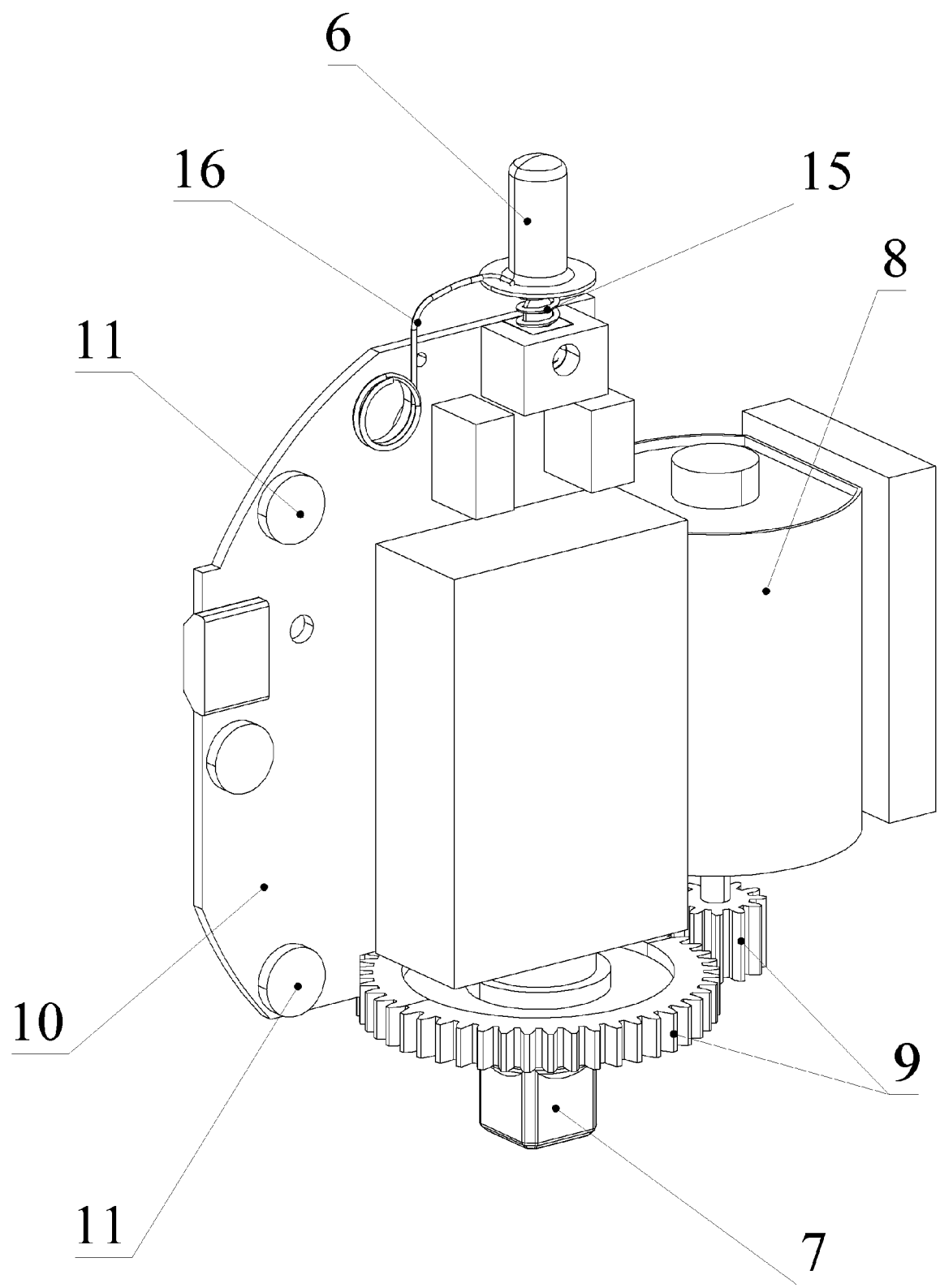
FIG. 4 is another schematic diagram of the driving box of the present invention.

As shown in FIG. 3 and FIG. 4, the driving box 3 is also provided with a circuit component and a driving component which are electrically connected. The fixed head 6 is electrically connected with the circuit component through an elastic part, and the fixed head 6 is in elastic contact with the upper shell 1. The driving component includes a motor 8 and a gear 9, and the movable head 7 is driven by motor 8 through the gear 9. The circuit component includes a control motherboard 10, which is provided with at least a receiving module, a vibration switch and an LED lamp.

In this embodiment, the motor 8 drives the movable head 7 to rotate through the gear 9, while the fixed head 6 moves relatively up and down through the extrusion of the upper and lower shells, thereby controlling the on-off of the branch circuit. The receiving module receives the remote control signal from the user, and the vibration switch is used to detect the vibration of the dog-teasing ball. In addition, in order to increase the interest of the dog-teasing ball toy, the circuit component is electrically connected with a plurality of adjustable and controllable LEDs, so that the dog-teasing ball provided by the present invention has a colorful lighting effect and attracts the attention of pets.

As shown in FIG. 4, the fixed head 6 is connected to the control mainboard 10 by a bent elastic steel wire 15 inside the driving box 3, and the control mainboard 10 has another fixed steel wire 16 extending to the edge of the small hole in the inner driving box 3. In some embodiments, the bent elastic steel wire 15 is provided as a bent elastic rigid sheet (not shown in the figure), and the fixed steel wire 16 is provided as a fixed steel sheet (not shown in the figure).

In the present invention, the circuit component is configured such that the motor 8 can only work when there is no electrical connection between the bent elastic steel wires 15 and the fixed steel wires 16. Specifically, the control mainboard 10 includes a receiving module, a vibration switch and three RGB color LED lights, and the fixed head 6 is plugged into the upper shell 1. When the upper shell 1 and the lower shell 2 are relatively screwed up, the fixed head 6 is compressed inward, and then the bent elastic steel wires 15 and the fixed steel wires 16 are disconnected, thereby driving the motor 8 to work.

When the outer shell is opened, the bent elastic steel wire 15 pushes the fixed head 6 out due to its elastic force, so that an electrical connection is formed between the bent elastic steel wire 15 and the fixed steel wire 16, resulting in a short circuit of the circuit board, thus making the motor 8 not work.

In this embodiment, the driving box 3 is also provided with a counterweight 17 biased to one side. When the outer shell vibrates under the action of external force, the vibration switch is turned on, and the control mainboard 10 drives the motor 8 to rotate after detecting that the vibration switch is turned on. When the shell ball is at rest, the remote controller can send an instruction to the control mainboard 10 to start the motor 8. Under the action of the vibration switch or the instruction of the remote controller, the motor 8 drives the movable head 7 to rotate. Because the movable head 7 is fixed with the outer shell, the whole driving box 3 rotates inside. Because of the counterweight iron block, the center of gravity is lower than the center, which drives the outer shell to rotate relatively in the opposite direction. In addition, when the motor 8 is working, the three color LED lights 11 will also flash.

In this embodiment, the elastic member includes a bent elastic steel wire 15 and a fixed steel wire 16, and the fixed head 6 has a reset movement tendency through the bent elastic steel wire 15. The circuit component also includes an on-off switch 12. The driving box 3 is provided with a slot 13 for exposing the on-off switch 12 for closing the circuit, and a decorative ring 14 is also arranged between the upper shell 1 and the lower shell 2 to increase the appreciation of the dog ball.

In some embodiments, the elastic member includes a bent elastic steel sheet and a fixed steel sheet, and the fixed head has a reset movement tendency through the bent elastic steel sheet.

At the same time, the present invention relates to a remote-controlled automatic dog-teasing ball, which comprises an upper shell 1 and a lower shell 2 which are spliced in a spherical shape, wherein a driving box 3 is arranged in the upper shell 1 and the lower shell 2; the upper and lower parts of the driving box 3 are respectively provided with a protruding fixed head 6 and a movable head 7; the movable head 7 and the lower shell 2 are assembled in a joint manner; the driving box 3 is also provided with a circuit component and a driving component which are electrically connected; the fixed head 6 and the circuit component are electrically connected through elastic part; and the fixed head 6 and the upper shell 1 are elastically abutted and linked; when the upper shell 1 and the lower shell 2 are screwed up, the fixed head 6 plays the role of disconnecting the circuit. In the state of disconnecting the circuit, the driving component can drive the movable head 7 to move and the movable head 7 drives the lower shell 2 to rotate. When the upper shell 1 and the lower shell 2 are not screwed up, the fixed head 6 plays a conducting role. In the conducting state, the driving component cannot drive the movable head 7 to move and the lower shell cannot rotate.

The driving component comprises a motor 8 and a gear 9, and the movable head 7 is driven by the motor 8 through the gear 9; the circuit component includes a control mainboard, and the control mainboard is provided with a vibration switch. When the vibration signal of the automatic dog-teasing ball is slapped by a pet, the motor 8 rotates and is transmitted to the lower shell 2 through the gear 9, so that the automatic dog-teasing ball rolls to a certain extent to realize the position movement; The control motherboard is provided with a receiving module, which is convenient for manual remote signal transmission and control and realizes the interaction between the owner and the pet dog; the control mainboard is also provided with an LED lamp, and when the motor 8 works, the LED lamp 11 flashes, thus enhancing the interest.

The remote-controlled automatic dog-teasing ball provided by the present invention does not rely on precise measuring elements such as angular position sensors or accelerometers, but adopts a vibration detection mode, which can adapt to various impacts and vibrations suffered by pets, and at the same time, the remote control mode is added, so that the combination of automatic and manual dog-teasing is realized, the interaction with pets is increased, and the feelings with pets are enhanced; meanwhile, three RGB lights also have excellent light and shadow effects in a dark environment, which greatly increases the interest, playability and attraction to pets.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A remote-controlled automatic dog-teasing ball, comprising an upper shell (1) and a lower shell (2) which are spliced into a ball shape, wherein a driving box (3) is arranged in the upper shell (1) and the lower shell (2), the upper and lower parts of the driving box (3) are respectively provided with a protruding fixed head (6) and a movable head (7); the movable head (7) and the lower shell (2) are assembled in linkage by splicing; a circuit component and a driving component which are electrically connected are also arranged in the driving box (3); the fixed head (6) and the circuit component are electrically connected by an elastic part, and the fixed head (6) and the upper shell (1) are elastically abutted and linked; when the upper shell (1) and the lower shell (2) are screwed up, the fixed head (6) plays a disconnecting function, and in a disconnecting state, the driving component can drive the movable head (7) to move, and the movable head (7) drives the lower shell (2) to rotate; when the upper shell (1) and the lower shell (2) are not screwed up, the fixed head (6) plays a conducting function, and in a conducting state, the driving component cannot drive the movable head (7) to move, and the lower shell (2) cannot move.

2. The remote-controlled automatic dog-teasing ball according to claim 1, wherein the driving component comprises a motor (8) and a gear (9), and transmission between the motor (8) and the movable head (7) is achieved by the gear (9); the circuit component comprises a control motherboard (10) which is provided with a vibration switch.

3. The remote-controlled automatic dog-teasing ball according to claim 1, wherein the driving component comprises a motor (8) and a gear (9), and transmission between the motor (8) and the movable head (7) is achieved by the gear (9); the circuit component comprises a control motherboard (10) which is provided with a vibration switch.

4. The remote-controlled automatic dog-teasing ball according to claim 1, wherein the driving component comprises a motor (8) and a gear (9), and transmission between the motor (8) and the movable head (7) is achieved by the gear (9); the circuit component comprises a control motherboard (10) which is provided with an LED lamp (10).

* * * * *